United States Patent
Chen et al.

(10) Patent No.: US 9,961,347 B2
(45) Date of Patent: May 1, 2018

(54) METHOD AND APPARATUS FOR BI-PREDICTION OF ILLUMINATION COMPENSATION

(71) Applicant: HFI Innovation Inc., Zhubei, Hsinchu County (TW)

(72) Inventors: Yi-Wen Chen, Taichung (TW); Tzu-Der Chuang, Zhubei (TW); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 23 days.

(21) Appl. No.: 14/771,561

(22) PCT Filed: Apr. 4, 2014

(86) PCT No.: PCT/CN2014/074785
§ 371 (c)(1),
(2) Date: Aug. 31, 2015

(87) PCT Pub. No.: WO2014/166360
PCT Pub. Date: Oct. 16, 2014

(65) Prior Publication Data
US 2015/0381986 A1    Dec. 31, 2015

Related U.S. Application Data

(60) Provisional application No. 61/810,385, filed on Apr. 10, 2013.

(51) Int. Cl.
*H04N 19/136* (2014.01)
*H04N 19/513* (2014.01)
(Continued)

(52) U.S. Cl.
CPC ....... *H04N 19/136* (2014.11); *H04N 13/0048* (2013.01); *H04N 19/105* (2014.11);
(Continued)

(58) Field of Classification Search
CPC ............. H04N 19/136; H04N 13/0048; H04N 19/513; H04N 19/597; H04N 19/105;
(Continued)

(56) References Cited

U.S. PATENT DOCUMENTS 8,295,634 B2    10/2012  Lee et al.
2008/0130750 A1  6/2008  Song
(Continued)

FOREIGN PATENT DOCUMENTS

CN    101193302 A    6/2008
CN    101325715      12/2008
(Continued)

OTHER PUBLICATIONS

International Search Report dated Jun. 24, 2014, issued in PCT/CN2014/074785.
(Continued)

*Primary Examiner* — Christopher S Kelley
*Assistant Examiner* — Nasim Nirjhar
(74) *Attorney, Agent, or Firm* — McClure, Qualey & Rodack, LLP (57) ABSTRACT

A method and apparatus for deriving aligned inter-view prediction for uni-prediction and bi-prediction in three-dimensional and multi-view coding with illumination compensation enabled are disclosed. When the illumination compensation is enabled, the derivation process for a single reference block in reference list_0 or reference list_1 in the case of uni-prediction is aligned with the derivation process for a reference block in reference list_0 and a reference block in reference list_1 in the case of bi-prediction. The
(Continued)

reconstruction process generates the reference block based on a temporal reference block when Inter prediction is used and based on an inter-view reference block when inter-view prediction is used. For the uni-prediction and bi-prediction, the same clipping process can be included in the reconstruction process, the illumination compensation process, or both.

12 Claims, 3 Drawing Sheets

(51) Int. Cl.
    *H04N 19/176*    (2014.01)
    *H04N 13/00*     (2006.01)
    *H04N 19/597*    (2014.01)
    *H04N 19/105*    (2014.01)
    *H04N 19/196*    (2014.01)
    *H04N 19/157*    (2014.01)
    *H04N 19/463*    (2014.01)

(52) U.S. Cl.
    CPC ......... *H04N 19/157* (2014.11); *H04N 19/176* (2014.11); *H04N 19/196* (2014.11); *H04N 19/513* (2014.11); *H04N 19/597* (2014.11); *H04N 19/463* (2014.11)

(58) Field of Classification Search
    CPC .. H04N 19/176; H04N 19/196; H04N 19/157; H04N 19/463
    See application file for complete search history.

(56) References Cited

U.S. PATENT DOCUMENTS

| | | | |
|---|---|---|---|
| 2009/0010323 A1* | 1/2009 | Su | H04N 19/597 375/240.01 |
| 2013/0163666 A1* | 6/2013 | Leontaris | H04N 19/00569 375/240.12 |
| 2013/0182768 A1* | 7/2013 | Jeong | H04N 19/00733 375/240.14 |
| 2013/0287106 A1 | 10/2013 | Lee et al. | |
| 2014/0185665 A1* | 7/2014 | Pu | H04N 19/00066 375/240.02 |

FOREIGN PATENT DOCUMENTS

| | | |
|---|---|---|
| WO | 2012031107 A1 | 3/2012 |
| WO | 2012044118 A | 4/2012 |
| WO | WO 2012/093890 | 7/2012 |
| WO | WO 2012/171442 | 12/2012 |

OTHER PUBLICATIONS

Tech, G., et al.; " 3D-HEVC Test Model 3;" Joint Collaborative Team on 3D Video Coding Extension Development of ITU-T SG 16 WP 3 and ISO/IEC JTC 1/SC 29/WG 11; Jan. 2013; pp. 1-91.
Kim, H.Y., et al.; "Motion compensation complexity reduction for bi-prediction;" Joint Collaborative Team on 3D Video Coding Extension Development of ITU-T SG 16 WP 3 and ISO/IEC JTC 1/SC 29/WG 11; Jul. 2011; pp. 1-9.

* cited by examiner

METHOD AND APPARATUS FOR BI-PREDICTION OF ILLUMINATION COMPENSATION

CROSS REFERENCE TO RELATED APPLICATIONS

The present invention is a National Phase Application of PCT Application No. PCT/CN2014/074785, filed on Apr. 4, 2014, which claims priority to U.S. Provisional Patent Application, Ser. No. 61/810,385, filed on Apr. 10, 2013, entitled "Modified Illumination Compensation in Video Coding". The priority applications are hereby incorporated by reference in their entirety.

FIELD OF INVENTION

The present invention relates to three-dimensional and multi-view video coding. In particular, the present invention relates to derivation of inter-view prediction for uni-prediction and bi-prediction in the case that illumination compensation is enabled.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras.

Figure 1:
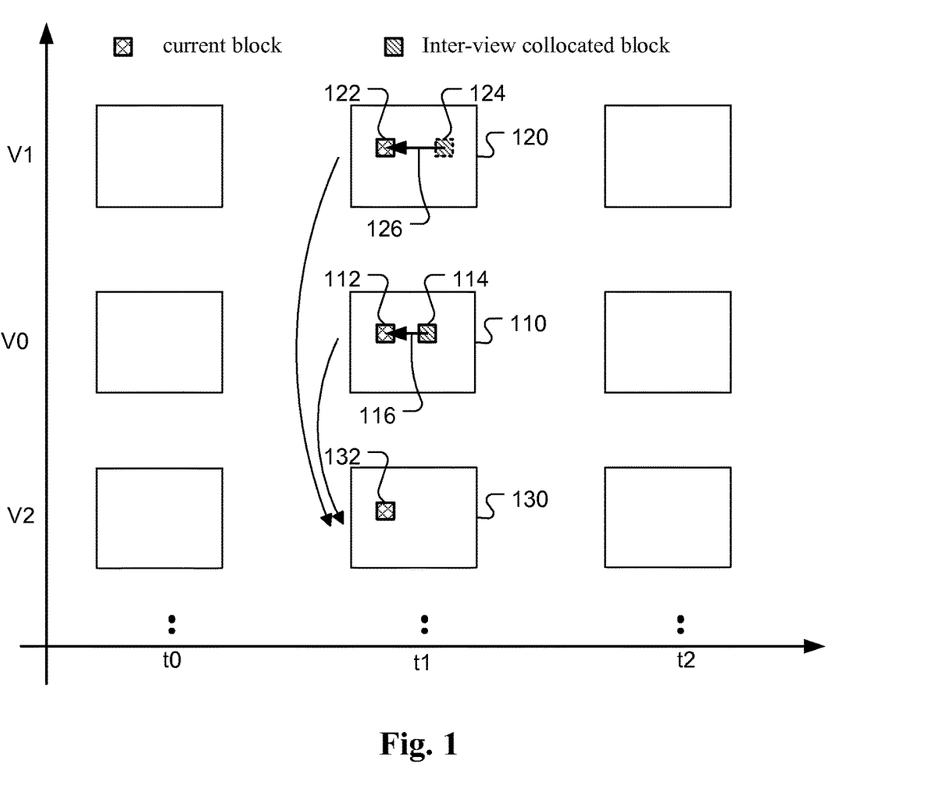
FIG. 1 illustrates an example of three-dimensional/multi-view coding, where motion compensated prediction (MCP) and disparity compensated prediction (DCP) are used.

FIG. 1 shows an exemplary prediction structure used in the common test conditions for 3D video coding. The video pictures and depth maps corresponding to a particular camera position are indicated by a view identifier (i.e., V0, V1 and V2 in FIG. 1). All texture pictures and depth maps that belong to the same camera position are associated with the same viewId (i.e., view identifier). The view identifiers are used for specifying the coding order within the access units and detecting missing views in error-prone environments. An access unit includes all video pictures and depth maps corresponding to the same time instant. Inside an access unit, the video picture and, when present, the associated depth map having viewId equal to 0 are coded first, followed by the video picture and depth map having viewId equal to 1, etc. The view with viewId equal to 0 (i.e., V0 in FIG. 1) is also referred to as the base view or the independent view. The base view video pictures can be coded using a conventional HEVC video coder without dependence on other views.

The example shown in FIG. 1 corresponds to a view coding order from V0 (i.e., base view) to V1, and followed by V2. The current block in the current picture being coded is in V2. According to HTM-6.0, all the MVs of reference blocks in the previously coded views can be considered as an inter-view candidate even if the inter-view pictures are not in the reference picture list of current picture. In FIG. 1, frames 110, 120 and 130 correspond to a video picture or a depth map from views V0, V1 and V2 at time t1 respectively. Block 132 is the current block in the current view, and blocks 112 and 122 are the current blocks in V0 and V1 respectively. For current block 112 in V0, a disparity vector (116) is used to locate the inter-view collocated block (114). Similarly, for current block 122 in V1, a disparity vector (126) is used to locate the inter-view collocated block (124).

Illumination compensation (IC) is a technique to reduce the intensity differences between views caused by the different light fields of two views captured by different cameras at different locations. In HTM, a linear IC model is disclosed by Liu et al. ("3D-CE2.h: Results of Illumination Compensation for Inter-View Prediction", Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, Document: JCT3V-B0045) to compensate the illumination discrepancy between different views. Parameters in IC model are estimated for each PU using available nearest reconstructed neighbouring pixels. Therefore, there is no need to transmit the IC parameters to the decoder. Whether to apply IC or not is decided at the coding unit (CU) level, and an IC flag is coded to indicate whether IC is enabled at the CU level. The flag is present only for the CUs that are coded using inter-view prediction. If IC is enabled for a CU and a PU within the CU is coded by temporal prediction (i.e., Inter prediction), the PU block is inferred to have IC disabled. The linear IC model used in inter-view prediction is shown in eqn. (1):

$$p(i,j)=a_{IC} \cdot r(i+dv_x, j+dv_y)+b_{IC} \text{ where } (i,j) \in PU_c \qquad (1)$$

where PUc is the current PU, (i, j) is the pixel coordinate in PUc, $(dv_x, dv_y)$ is the disparity vector of PUc, p(i, j) is the prediction of PUc, r(·,·) is the reference picture of PU from a neighboring view, and $a_{IC}$ and $b_{IC}$ are parameters of the linear IC model.

Figure 2A:
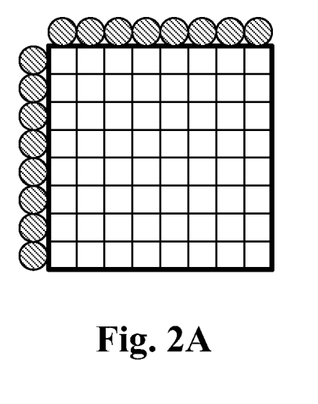
FIG. 2A and FIG. 2B illustrates an example of neighboring pixels of a current block and a reference block being used to derive the illumination compensation parameters.
Figure 2B:
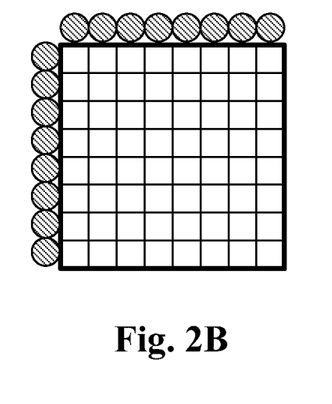

To estimate parameters $a_{IC}$ and $b_{IC}$ for a PU, two set of pixels as shown in FIG. 2A and FIG. 2B are used. As shown in FIG. 2A, the neighboring pixels consists of reconstructed neighboring pixels in the left column and in the above row (shown as circles) of the current CU (indicated by thick lined box), where the CU that contains the current PU. As shown in FIG. 2B, the other set of pixels correspond to neighboring pixels (shown as circles) of a reference block (indicated by thick lined box) of the current CU. The reference block of the current CU is located by using the location of the current PU and the disparity vector of the current PU.

An adaptive luminance compensation tool for inter-view video coding is disclosed by Mishurovskiy et al. ("CE2.A results on inter-view coding with adaptive luminance compensation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, Document: JCT3V-B0031). This adaptive luminance compensation is only applied to P slices. A macroblock (MB) level flag is transmitted for a Skip MB, P16×16, P16×8, P8×16 and P8×8 MB to turn the adaptive luminance compensation On or Off.

In HTM-6.0, when the Inter prediction is uni-prediction, the clipping is first applied to the interpolated pixel output (i.e., predSamplesL0[x][y] and predSamplesL1[x][y] for L0 (reference list 0) and L1 (reference list 1) respectively) from the DCT-based interpolation filter (DCTIF) to clip the pixel value to a valid range as shown in eqn. (2) and eqn. (3) for L0 and L1 respectively. The interpolated pixels correspond to motion-compensated reconstructed pixels.

$$\text{clipPredVal}=\text{Clip3}(0,(1<<\text{bitDepth})-1,(\text{predSamples}L0[x][y]+\text{offset1})>>\text{shift1}), \quad (2)$$

$$\text{clipPredVal}=\text{Clip3}(0,(1<<\text{bitDepth})-1,(\text{predSamples}L1[x][y]+\text{offset1})>>\text{shift1}), \quad (3)$$

where Clip3(a,b,c) is a clipping function that clips the value c between a and b. offset1, shift1 are rounding factors. As shown in eqn. (2) and eqn. (3), the interpolated pixel output is clipped to the range from 0 to the largest value that can be represented by bitDepth bits (i.e., $(1<<\text{bitDepth})-1$).

The clipped pixels of the reference block are then processed by the illumination compensation according to the linear IC model to clip the value to a valid range. After the IC operations, the pixel values are again clipped to a valid range as shown in eqn. (4) and eqn. (5) for L0 and L1 respectively and the clipped results are used as predictors.

$$\text{predSamples}[x][y]=!\text{puIcFlag}L0?\text{clipPredVal}: (\text{Clip3}(0,(1<<\text{bitDepth})-1,(\text{clipPredVal}*\text{icWeight}L0)>>\text{icShift}L0)+\text{icOffset}L0) \quad (4)$$

$$\text{predSamples}[x][y]=!\text{puIcFlag}L1?\text{clipPredVal}: (\text{Clip3}(0,(1<<\text{bitDepth})-1,(\text{clipPredVal}*\text{icWeight}L1)>>\text{icShift}L1)+\text{icOffset}L1) \quad (5)$$

where s=t?u:v means if t is TRUE (or equal to 1), s=u; otherwise s=v. According to eqn. (4) and (5), when the IC flag for the PU (i.e., puIcFlagL0 and puIcFlagL1) is not TRUE, the clipped values based on eqn. (2) and (3) are used directly; otherwise the clipped values based on eqn. (2) and (3) are further illumination compensated and clipped. Therefore, when IC flag is TRUE, the reconstructed reference pixels will be clipped twice (i.e., in eqn, 2&4 or in eqn. 3&5).

For the bi-prediction case, the interpolated pixels for each list (i.e., L0 or L1) are not clipped nor the illumination compensated outputs as shown in eqn. (6) and eqn. (7). The illumination compensated pixels for each list are then averaged and clipped into a valid range as shown in eqn. (8).

$$\text{predVal0}=!\text{puIcFlag}L0?\text{predSamples}L0[x][y]: ((\text{predSamples}L0[x][y]*\text{icWeight}L0)>>\text{icShift}L0)+(\text{icOffset}L0<<\text{shift1})) \quad (6)$$

$$\text{predVal1}=!\text{puIcFlag}L1?\text{predSamples}L1[x][y]: ((\text{predSamples}L1[x][y]*\text{icWeight}L1)>>\text{icShift}L1)+(\text{icOffset}L1<<\text{shift1})) \quad (7)$$

$$\text{predSamples}[x][y]=\text{Clip3}(0,(1<<\text{bitDepth})-1,(\text{predVal0}+\text{predVal1}+\text{offset2})>>\text{shift2}) \quad (8)$$

where icWeightL0, icShiftL0, icOffsetL0, icWeightL1, icShiftL1 and icOffsetL1 are IC parameters.

As shown above, the derivation process for the inter-view prediction with IC enabled is different between uni-prediction and bi-prediction. When motion information associated with the bi-prediction refers to a same reference block, an encoder may simplify the derivation process by using the uni-prediction instead of bi-prediction. If the decoder still use bi-prediction, the encoder and decoder may have different predictions. In this case, one side may have uni-prediction and the other side may have bi-prediction. When the motion information associated with bi-prediction points to a same reference block, it is computationally more efficient to use the uni-prediction instead of the bi-prediction. The uni-prediction can be done by converting the original bi-prediction into uni-prediction using only list 0 prediction corresponding to the original list 0 MV and reference index. Due to the different IC derivation process for uni-prediction and bi-prediction, a coding system may run into mismatch issue when the motion information associated with bi-prediction refers to a same reference block. It is desirable to take advantage of the reduced computational complexity of uni-prediction without causing mismatch issue when motion information associated with bi-prediction refers to a same reference block.

SUMMARY OF THE INVENTION

A method and apparatus for deriving aligned inter-view prediction for uni-prediction and bi-prediction in three-dimensional and multi-view coding with illumination compensation enabled are disclosed. When the illumination compensation is enabled and the uni-prediction is selected for the current texture block, a single reference block in reference list_0 or reference list_1 is generated by invoking reconstruction process for the current texture block. The reconstruction process generates the single reference block based on a single temporal reference block when Inter prediction is used for the current texture block, and based on a single inter-view reference block when inter-view prediction is used for the current texture block. A single illumination compensated reference block is then generated by applying the illumination compensation process to the single reference block and the single illumination compensated reference block is used as the final reference block. When the illumination compensation is enabled and the bi-prediction is selected for the current texture block, a first reference block in the reference list_0 and a second reference block in the reference list_1 are generated by invoking the same reconstruction process as that for the uni-prediction. A first illumination compensated reference block and a second illumination compensated reference block by applying the same illumination compensation process as that for the uni-prediction to the first reference block and the second reference block respectively. The final reference block is derived from an average of the first illumination compensated reference block and the second illumination compensated reference block. After the final reference block is derived for the uni-prediction or the bi-prediction, the current texture block is encoded or decoded using the final reference block as a predictor.

In one embodiment, the output from the reconstruction process is clipped to a first valid range. In another embodiment, the output from the illumination compensation process is clipped to the first valid range. In yet another invention, both the outputs from the reconstruction process and the illumination compensation process are clipped to the first valid range.

The present invention enables identical motion checking. In the case that the bi-prediction is selected and the motion information associated with the bi-prediction refers to the same reference block, the bi-prediction can be simplified as the uni-prediction prediction. In another embodiment, the motion information associated with the reference list_0 or the reference list_1 is modified. For example, an offset vector (m,n) can be added to the motion vector for one of the identical reference blocks. In another example, the reference index associated with one of the identical reference blocks can be set to the smallest reference index in the respective reference list and a scaled motion vector according to picture order distance related to the corresponding reference index and the smallest reference index is used. In yet another example, a different interpolation filter can be used to generate one of the same reference blocks.

DETAILED DESCRIPTION

When two sets of motion information associated with the two reference blocks for bi-prediction correspond to the same reference block, the Inter prediction based on bi-prediction can be converted to uni-prediction in order to reduce the computational complexity of redundant motion according to the HEVC (High Efficiency Video Coding) standard. In order to take this advantage, the encoder has to check whether the two sets of motion information associated with the two reference blocks for bi-prediction refer to the same reference block. If so, the Inter prediction based on the uni-prediction can be used instead of the bi-prediction. The checking process is referred as identical motion checking in this disclosure. However, this flexibility is not supported in 3D-HEVC with IC (Illumination Compensation) enabled due to the different clipping operations used for uni-prediction and bi-prediction.

In the present invention, a unified (also called aligned) clipping process is disclosed for uni-prediction and bi-prediction when IC is enabled. The unified clipping process will produce the same predictor regardless whether the uni-prediction or the bi-prediction is adopted when the two sets of motion information associated with the two reference blocks for bi-prediction refer to the same reference block.

In the first embodiment, both the uni-prediction and the bi-prediction are applied two clipping operations equally, where the clipping operations are the same as the clipping operations applied to the uni-prediction in HEVC standard. For the uni-prediction operations as shown in eqn. (2)-eqn. (5), the interpolated pixels output from the interpolation filter are processed by a first clipping operation. Then the clipped pixels are processed by IC operations. A second clipping operation is applied to the illumination compensated pixels to produce a final prediction output. For the bi-prediction case, the illumination compensated pixels from two respective reference blocks are averaged. The detail operations are shown below. The clipping process for the IC associated with respective reference blocks is essentially the same as that of the uni-prediction except for notation modifications (indicated by the bold style) as shown in eqn. (9) to eqn. (12).

$$\text{clipPredVal0} = \text{Clip3}(0,(1<<\text{bitDepth})-1,(\text{predSamples}L0[x][y]+\text{offset1})>>\text{shift1}) \quad (9)$$

$$\text{clipPredVal1} = \text{Clip3}(0,(1<<\text{bitDepth})-1,(\text{predSamples}L1[x][y]+\text{offset1})>>\text{shift1}) \quad (10)$$

$$\text{predVal0} = \text{predSamples}[x][y] = !\text{puIcFlag}L0?\text{clipPredVal}: (\text{Clip3}(0,(1<<\text{bitDepth})-1,(\text{clipPredVal0}*ic\text{Weight}L0)>>ic\text{Shift}L0)+ic\text{Offset}L0) \quad (11)$$

$$\text{predVal1} = \text{predSamples}[x][y] = !\text{puIcFlag}L1?\text{clipPredVal}: (\text{Clip3}(0,(1<<\text{bitDepth})-1,(\text{clipPredVal1}*ic\text{Weight}L1)>>ic\text{Shift}L1)+ic\text{Offset}L1) \quad (12)$$

The average operation to obtain the prediction from the two IC compensated and clipped reference blocks can be the same as that shown in eqn. (8).

In the second embodiment, the clipping process for the uni-prediction is modified to use single clipping. For the uni-prediction, the clipping is first applied to the interpolated pixels output from the DCT-based interpolation filter (DC-TIF) to clip the pixel value to a valid range as shown in eqn. (2) and eqn. (3) for L0 and L1 respectively. However, when IC is enabled for the current PU as indicated by puIcFlagL0 and puIcFlagL1 respectively, no further clipping will be applied. Accordingly, the uni-prediction operations of eqn. (4) and eqn. (5) are modified as follow:

$$\text{predSamples}[x][y] = !\text{puIcFlag}L0?\text{clipPredVal}: (\text{Clip3}(0,(1<<\text{bitDepth})-1,(\text{predSamples}L0[x][y]*ic\text{Weight}L0)>>ic\text{Shift}L0)+ic\text{Offset}L0) \quad (13)$$

$$\text{predSamples}[x][y] = !\text{puIcFlag}L1?\text{clipPredVal}: (\text{Clip3}(0,(1<<\text{bitDepth})-1,(\text{predSamples}L1[x][y]*ic\text{Weight}L1)>>ic\text{Shift}L1)+ic\text{Offset}L1) \quad (14)$$

As shown in eqn. (13) and (14), the IC parameters icWeightL0 and icWeightL1 are applied to the unclipped samples predSamplesL0[x][y] and predSamplesL1[x][y] respectively. Therefore, only one clipping is applied to samples for both the uni-prediction and bi-prediction cases.

While the bi-prediction can be converted to the uni-prediction when two sets of motion information for bi-prediction refers to a same reference block, one of the two sets of motion information can also be modified so that the two sets of motion information will refer to different reference blocks. For example, an offset vector (m,n) can be added to one motion vector, where m and n are two integers. In another example, one reference index can be modified to the smallest reference index. The corresponding motion vector can be modified to the scaled motion vector according to the picture order count (POC) distance related to the corresponding reference index and the smallest reference index. In another embodiment, when two sets of motion information for bi-prediction refers to a same reference block, a different interpolation filter can be used to derive one of the reference blocks.

The performance of a 3D/multi-view video coding system incorporating unified illumination compensation for uni-prediction and bi-prediction according to an embodiment of the present invention is compared with that of a conventional system based on HTM-6.0 as shown in Table 1. The performance comparison is based on different sets of test data listed in the first column. In the conventional system based on HTM-6.0, identical motion checking is not performed; otherwise a mismatch issue may occur as mentioned before. On the other hand, the system incorporating an embodiment of the present invention checks whether the motion information associated with bi-prediction refers to the same reference block or not. If the motion information associated with bi-prediction refers to the same reference block, the bi-prediction is converted to uni-prediction. For both uni-prediction and bi-prediction according to the present invention, a unified clipping process is used. The comparison shown in Table 1 is based on the unified clipping where two clippings are used in both the uni-prediction and bi-prediction. The aligned inter-prediction for uni-prediction and bi-prediction can also be applied to other inter-prediction tools such as view synthesis prediction or weighted prediction to support the property of identical MV checking.

The BD-rate differences are shown for texture pictures in view 1 (video 1) and view 2 (video 2). A negative value in the BD-rate implies that the present invention has a better performance. As shown in Table 1, the BD-rates for video 1 and video 2 incorporating an embodiment of the present invention are the same as the conventional system. The second group of performance is the bitrate measure for texture video only (video/video bitrate), the total bitrate (texture bitrate and depth bitrate) for texture video (video/total bitrate) and the total bitrate for coded and synthesized video (synth./total bitrate). As shown in Table 1, the average performance in this group also is also the same as the conventional HTM-6.0. The processing times (encoding time, decoding time and rendering time) are also compared. As shown in Table 1, the decoding time is reduced by about 5%.

Figure 3:
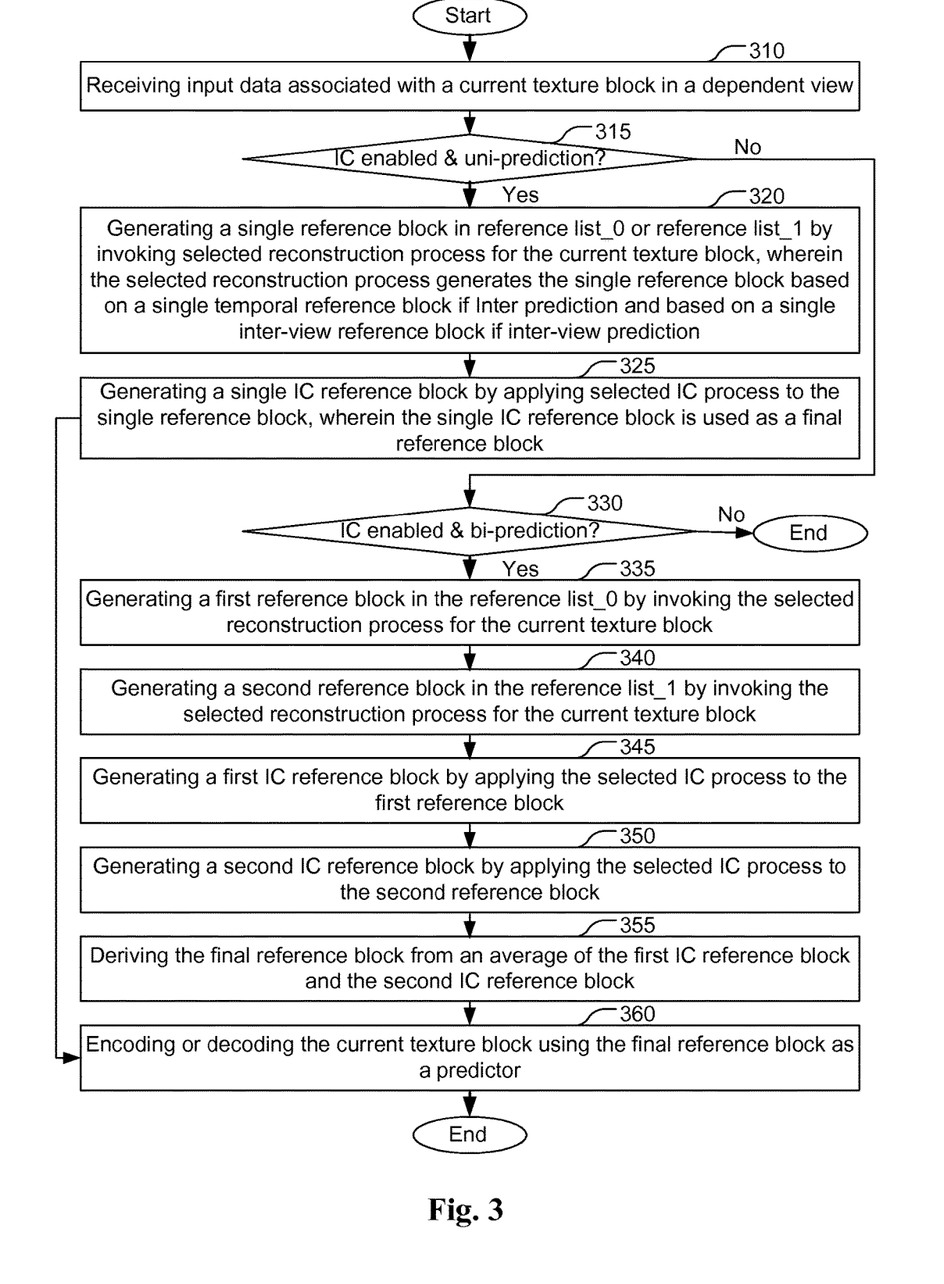
FIG. 3 illustrates an exemplary flowchart for deriving aligned inter-view prediction for uni-prediction and bi-prediction according to an embodiment of the present invention in three-dimensional and multi-view coding with illumination compensation enabled.

When the illumination compensation is enabled and the bi-prediction is selected for the current texture block (as checked in step 330), a first reference block in the reference list_0 and a second reference block in the reference list_1 are generated by invoking the same reconstruction process at that for the uni-prediction for the current texture block as shown in steps 335 and 340. A first illumination compensated reference block and a second illumination compensated reference block are generated by applying the same illumination compensation process as that for the uni-prediction to the first reference block and the second reference block respectively as shown in steps 345 and 350. The final reference block is then derived from an average of the first illumination compensated reference block and the second illumination compensated reference block as shown in step 355. After the final reference block is derived for uni-prediction or bi-prediction, the current texture block is encoded or decoded using the final reference block as a predictor as shown in step 360.

The flowchart shown above is intended to illustrate an example of 3D/multi-view coding using aligned inter-view prediction for uni-prediction and bi-prediction in three-dimensional and multi-view coding with illumination compensation enabled. A person skilled in the art may modify each step, re-arranges the steps, split a step, or combine steps to practice the present invention without departing from the spirit of the present invention

TABLE 1

|  | video 0 | video 1 | video 2 | video PSNR/ video bitrate | video PSNR/ total bitrate | synth PSNR/ total bitrate | enc time | dec time | ren time |
| --- | --- | --- | --- | --- | --- | --- | --- | --- | --- |
| Balloons | 0.0% | 0.0% | 0.0% | 0.0% | 0.0% | 0.0% | 99.9% | 104.0% | 100.4% |
| Kendo | 0.0% | 0.0% | 0.0% | 0.0% | 0.0% | 0.0% | 99.6% | 92.0% | 100.3% |
| Newspaper_CC | 0.0% | 0.0% | 0.0% | 0.0% | 0.0% | 0.0% | 100.1% | 89.2% | 97.5% |
| GT_Fly | 0.0% | 0.0% | 0.0% | 0.0% | 0.0% | 0.0% | 100.3% | 96.7% | 99.9% |
| Poznan_Hall2 | 0.0% | 0.0% | 0.0% | 0.0% | 0.0% | 0.0% | 100.9% | 96.7% | 99.8% |
| Poznan_Street | 0.0% | 0.0% | 0.0% | 0.0% | 0.0% | 0.0% | 99.7% | 101.7% | 100.7% |
| Undo_Dancer | 0.0% | 0.0% | 0.0% | 0.0% | 0.0% | 0.0% | 99.7% | 87.6% | 99.3% |
| 1024 × 768 | 0.0% | 0.0% | 0.0% | 0.0% | 0.0% | 0.0% | 99.8% | 95.1% | 99.4% |
| 1920 × 1088 | 0.0% | 0.0% | 0.0% | 0.0% | 0.0% | 0.0% | 100.1% | 95.7% | 99.9% |
| average | 0.0% | 0.0% | 0.0% | 0.0% | 0.0% | 0.0% | 100.0% | 95.4% | 99.7% |

FIG. 3 illustrates an exemplary flowchart of a three-dimensional/multi-view coding system incorporating aligned inter-view prediction for uni-prediction and bi-prediction in three-dimensional and multi-view coding with illumination compensation enabled according to an embodiment of the present invention. The system receives input data associated with a current texture block in a dependent view as shown in step 310. For encoding, the input data associated with a current texture block in a dependent view corresponds to the pixel data to be coded. For decoding, the input data associated with the current texture block in the dependent view corresponds to the coded pixel data to be decoded. The input data associated with the current texture block may be retrieved from memory (e.g., computer memory, buffer (RAM or DRAM) or other media) or from a processor. If illumination compensation is enabled and the uni-prediction is selected for the current block (as checked in step 315), a single reference block in reference list_0 or reference list 1 is generated by invoking a reconstruction process for the current texture block as shown in step 320. The reconstruction process generates the single reference block based on a single temporal reference block when Inter prediction is used for the current texture block, and based on a single inter-view reference block when inter-view prediction is used for the current texture block. A single illumination compensated reference block is generated by applying a selected illumination compensation process to the single reference block as shown in step 325. The single illumination compensated reference block is used as a final reference block.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of predictive coding in three-dimensional (3D) and multi-view coding systems, the method comprising:
receiving input data associated with a current texture block in a dependent view;
when illumination compensation is enabled and uni-prediction is selected for the current texture block,
generating a single reference block in reference list_0 or reference list_1 by invoking a selected reconstruction process for the current texture block, wherein the selected reconstruction process generates the single reference block based on a single temporal reference block when Inter prediction is used for the current texture block, and based on a single inter-view reference block when inter-view prediction is used for the current texture block; and
generating a single illumination compensated reference block by applying a selected illumination compensation process to the single reference block, wherein the single illumination compensated reference block is used as a final reference block;
when the illumination compensation is enabled and bi-prediction is selected for the current texture block,
generating a first reference block in the reference list_0 by invoking the selected reconstruction process for the current texture block;
generating a second reference block in the reference list_1 by invoking the selected reconstruction process for the current texture block;
generating a first illumination compensated reference block by applying the selected illumination compensation process to the first reference block;
generating a second illumination compensated reference block by applying the selected illumination compensation process to the second reference block; and
deriving the final reference block from an average of the first illumination compensated reference block and the second illumination compensated reference block; and
encoding or decoding the current texture block using the final reference block as a predictor,
wherein a unified clipping process is applied for uni-prediction and bi-prediction.

2. The method of claim 1, wherein the unified clipping process comprises a first clipping process on first output from the selected reconstruction process, wherein the first clipping process on the first output from the selected reconstruction process is invoked by each of said generating the single reference block, said generating the first reference block and said generating the second reference block, wherein the first clipping process clips the first output to a first valid range.

3. The method of claim 2, wherein the unified clipping process further comprises a second clipping process on second output from the selected illumination compensation process, wherein the second clipping process on the second output from the selected illumination compensation process is invoked by each of said generating the single illumination compensated reference block, said generating the first illumination compensated reference block and said generating the second illumination compensated reference block.

4. The method of claim 1, wherein the unified clipping process comprises a first clipping process on second output from the selected illumination compensation process, wherein the first clipping process on the second output from the selected illumination compensation process is invoked by each of said generating the single illumination compensated reference block, said generating the first illumination compensated reference block and said generating the second illumination compensated reference block.

5. The method of claim 1, when the illumination compensation is enabled and the bi-prediction is selected for the current texture block, the bi-prediction is converted to the uni-prediction if motion information associated with the bi-prediction refers to a same reference block in the reference list_0 and the reference list_1.

6. The method of claim 1, when the illumination compensation is enabled and the bi-prediction is selected for the current texture block, motion information associated with the reference list_0 or the reference list_1 is modified if the motion information associated with the bi-prediction refers to a same reference block in the reference list_0 and the reference list_1.

7. The method of claim 6, when the motion information associated with the reference list_0 or the reference list_1 is modified by adding an offset vector (m,n) if the motion information associated with the bi-prediction refers to a same reference block in the reference list_0 and the reference list_1, wherein m and n are integers.

8. The method of claim 6, when the motion information associated with the reference list_0 or the reference list_1 is modified by changing a corresponding reference index to a smallest reference index in a corresponding reference list if the motion information associated with the bi-prediction refers to a same reference block in the reference list_0 and the reference list_1, wherein the motion information modified uses a modified motion vector scaled according to picture order count distance related to the corresponding reference index and the smallest reference index.

9. The method of claim 1, when the illumination compensation is enabled and the bi-prediction is selected for the current texture block, the first reference block or the second reference block is generated using another reconstruction process if motion information associated with the bi-prediction refers to a same reference block in the reference list_0 and the reference list_1, wherein said another reconstruction process includes an interpolation filter different from the selected reconstruction process.

10. An apparatus for predictive coding in three-dimensional (3D) and multi-view coding systems, the apparatus comprising one or more electronic circuits, wherein said one or more electronic circuits are configured to:
- receive input data associated with a current texture block in a dependent view;
- when illumination compensation is enabled and uni-prediction is selected for the current texture block,
  - generate a single reference block in reference list_0 or reference list_1 by invoking a selected reconstruction process for the current texture block, wherein the selected reconstruction process generates the single reference block based on a single temporal reference block when Inter prediction is used for the current texture block, and based on a single inter-view reference block when inter-view prediction is used for the current texture block; and
  - generate a single illumination compensated reference block by applying a selected illumination compensation process to the single reference block, wherein the single illumination compensated reference block is used as a final reference block;
- when the illumination compensation is enabled and bi-prediction is selected for the current texture block,
  - generate a first reference block in the reference list_0 by invoking the selected reconstruction process for the current texture block;
  - generate a second reference block in the reference list_1 by invoking the selected reconstruction process for the current texture block;
  - generate a first illumination compensated reference block by applying the selected illumination compensation process to the first reference block;
  - generate a second illumination compensated reference block by applying the selected illumination compensation process to the second reference block; and
  - derive the final reference block from an average of the first illumination compensated reference block and the second illumination compensated reference block; and
- encode or decode the current texture block using the final reference block as a predictor, wherein a unified clipping process is applied for uni-prediction and bi-prediction.

11. The apparatus of claim 10, when the illumination compensation is enabled and the bi-prediction is selected for the current texture block, the bi-prediction is converted to the uni-prediction if motion information associated with the bi-prediction refers to a same reference block in the reference list_0 and the reference list_1.

12. The apparatus of claim 10, when the illumination compensation is enabled and the bi-prediction is selected for the current texture block, motion information associated with the reference list_0 or the reference list_1 is modified if the motion information associated with the bi-prediction refers to a same reference block in the reference list_0 and the reference list_1.

* * * * *